United States Patent [19]
Spannaus et al.

[11] Patent Number: 5,646,651
[45] Date of Patent: Jul. 8, 1997

[54] BLOCK MODE, MULTIPLE ACCESS MULTI-MEDIA/GRAPHICS MEMORY

[76] Inventors: John Spannaus, 9402 Scenic Bluff Dr., Austin, Tex. 78733; Alexander G. MacInnis, 121 Windsor Dr., San Carlos, Calif. 94070

[21] Appl. No.: 355,875

[22] Filed: Dec. 14, 1994

[51] Int. Cl.[6] .................................................. G09G 5/00
[52] U.S. Cl. ............................................ 345/185; 345/201
[58] Field of Search ........................... 345/185, 113–120, 345/201, 198; 395/162–166, 148, 154, 157, 158, 340, 343, 501, 508, 806; 348/552, 564–567

[56] References Cited

U.S. PATENT DOCUMENTS

| | | | |
|---|---|---|---|
| 5,392,396 | 2/1995 | MacInnis | 395/164 |
| 5,402,147 | 3/1995 | Chen et al. | 345/115 |
| 5,438,663 | 8/1995 | Matsumoto et al. | 395/162 |

OTHER PUBLICATIONS

Bradley, et al., "User Interface for Adjusting Video Source Area", IBM Technical Disclosure Bulletin, V36 N09A, dtd Sep. 1993, pp. 449–452.

MacInnis, "Tear–Free Updates of Video and Graphics", IBM Technical Disclosure Bulletin, V36 N09A, dtd Sep. 1993, pp. 341–342.

MacInnis, "Clipping and Overlay of Multiple Sources of Video and Graphics in Display Windows", IBM Technical Disclosure Bulletin, V36 N09A, dtd Sep. 1993, pp. 105–106.

Chen, et al., "Input Locking for an Integrated (Single) Frame Buffer", IBM Technical Disclosure Bulletin, V36 N07, dtd Jul. 1993, pp. 539–540.

Pascoe, "Manual Multiple Source Selection in Computer–Assisted Video Conference", IBM Technical Disclosure Bulletin, V34 N7A, dtd Dec. 1991, pp. 380–381.

Bealkowski, et al. "Prioritizing Video Pixel Selection", IBM Technical Disclosure Bulletin, V32 N11, dtd Apr. 1990, pp. 195–198.

*Primary Examiner*—Mark R. Powell
*Assistant Examiner*—Martin Loui
*Attorney, Agent, or Firm*—Whitham, Curtis, Whitham & McGinn; Volel Emile

[57] ABSTRACT

The integration of Video and Graphics Rasterization along with associated functional blocks provides a balanced MultiMedia/Graphics solution to the technology/bandwidth problem of today's higher density memories. Video rasterization, graphic rasterization, and window identifier functionality are contained on the same chip, fast Random Access Memory for each is provided for each, and the wide bus and high speed accesses to within the chip are shared and contained. The problem is therefore solved in a manner beneficial to both rasterization and video components of Multi-Media and Graphics. Window identification and control functions are added into the memory module, thus permitting both video and graphics rasterization functionality to be closely coupled to an independent high speed SRAM within the Memory Module, and thus applying the full internal wide bus bandwidth of the Frame Buffer memory to both real time video Multi-Media and graphics rasterization functions.

5 Claims, 2 Drawing Sheets

5,646,651

BLOCK MODE, MULTIPLE ACCESS MULTI-MEDIA/GRAPHICS MEMORY

BACKGROUND OF THE INVENTION

1. Field of the Invention

The present invention generally relates to memory technology and, more particularly, to the use of wide data paths in memory densities over 4 megabits.

2. Description of the Prior Art

As memory technology continues to advance in capacities in an exponential fashion, the display resolution requirement is increasing in a linear fashion. While graphics developers have traditionally depended on wide data paths and interleaving to get sufficient graphics memory bandwidth, they are now left in a quandary as to how to take advantage of memory densities over about 4 megabits.

Raster-scan conversion techniques have traditionally been dependent on a wide data path connection to high speed Dynamic Random Access Memory (DRAM) or Video Random Access Memory (VRAM). Chip technology has evolved to the point that it is now a problem to take advantage of newer high density memory because the number of chips required to meet the capacity requirements is less than the number of chips required to provide a wide (fast) path to memory. Also the number of input/outputs and pins per chip, required to maintain the wide bandwidths in fewer chips, has practical limits. For low end two-dimensional Reduced Instruction Set Computer (RISC) based systems, this becomes an real problem at about the density level of 2 to 4 megabit memory chips. Thus, needed wide path between the Rasterizer/Display Controller and the frame buffer VRAM modules are no longer available to take advantage of new technology memory modules providing higher density and less chips.

SUMMARY OF THE INVENTION

It is therefore an object of the present invention to provide an efficient use of a wide data path within the memory chip.

It is another object of the invention to provide a solution to the bandwidth problem of high density memory chips in a graphics memory.

It is a further object of the invention to provide a higher level of integration of video graphics to take advantage of the internal bandwidth of high density memory chips.

According to the invention, there is provided a novel combination of separate Window Identification functions and independent high speed static RAMs, allowing both real-time video and graphical rasterization functions to take advantage of the internal bandwidth. The invention provides a highly integrated Multi-Media/Graphics Memory module that makes efficient use of a wide data path within the memory chip to allow the combining of multiple sources of data, i.e., video and graphics, to the same multimedia display screen. Window identification and control functions are added into the memory module, thus permitting both video and graphics rasterization functionality to be closely coupled to an independent high speed static RAM (SRAM) within the Memory Module, and thus applying the full internal wide bus bandwidth of the Frame Buffer memory to both real time video Multi-Media and graphics rasterization functions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
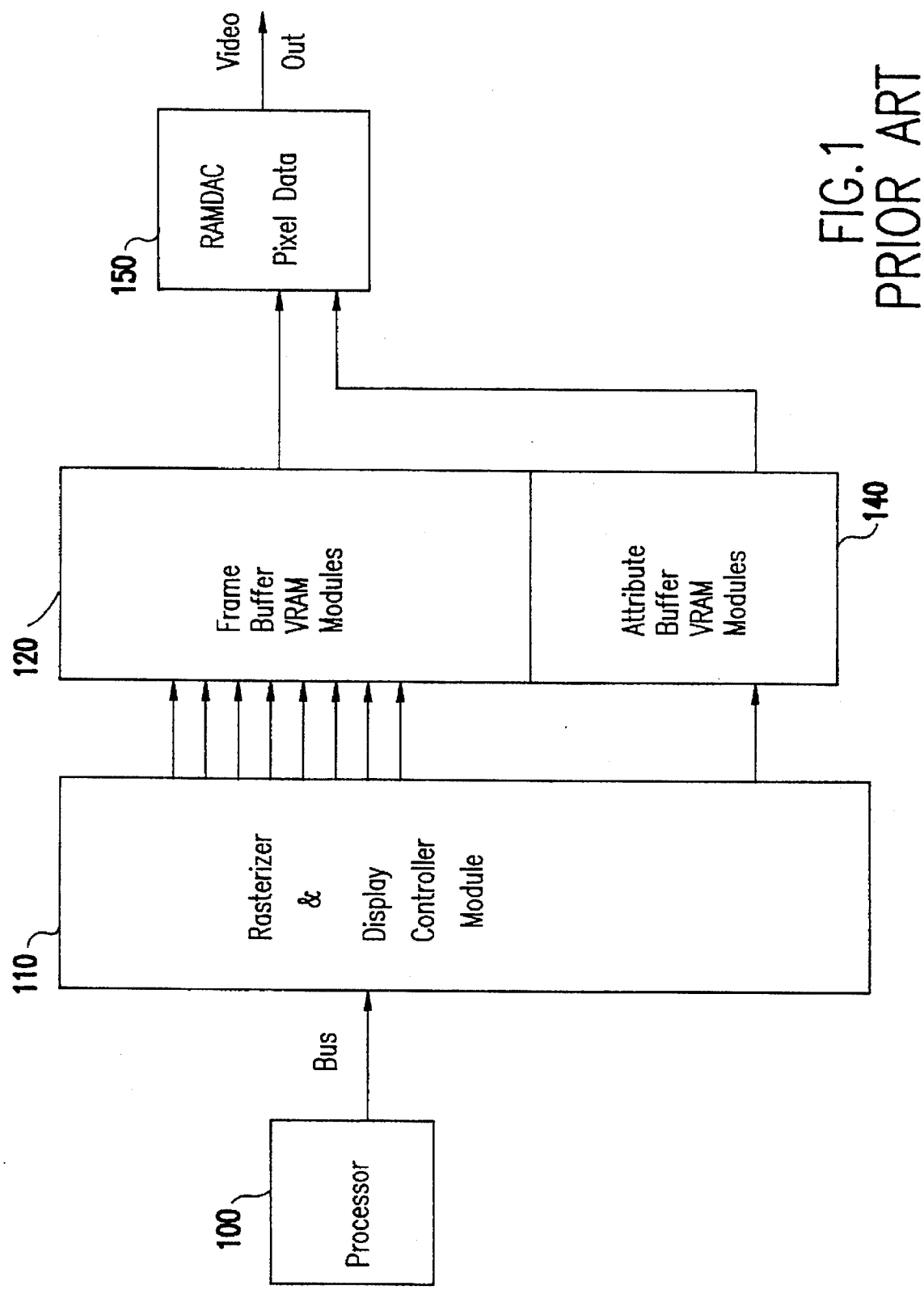
FIG. 1 is a workstation graphics system as it is known in the art.

Referring now to the drawings, and more particularly to FIG. 1, there is shown a typical two-dimensional workstation graphics subsystem as implemented today. A Processor 100 performs general display screen server tasks such as window management and generation of display specific rasterization primitives to serve the graphic library functions. It may also serve as the application processor. The Processor 100 passes rasterization primitives and possibly slow motion video over the bus to the Rasterizer and Display Controller 110. The rasterizer 110 controls the accesses to the Frame Buffer 120 and possibly a Window Identification (WID) buffer 140. The WID buffer 140 may contain information about the pixels in the buffer, such as, to which buffer they belong and whether they are protected from being written. The frame buffer 120 is generally composed of multiple modules of VRAM, thus allowing a wide bus, fast access buffer. The VRAM serial port feeds a RAM Digital-to-Analog Converter (RAMDAC) 150 which generates the video data stream for a Cathode Ray Tube (CRT) display.

Figure 2:
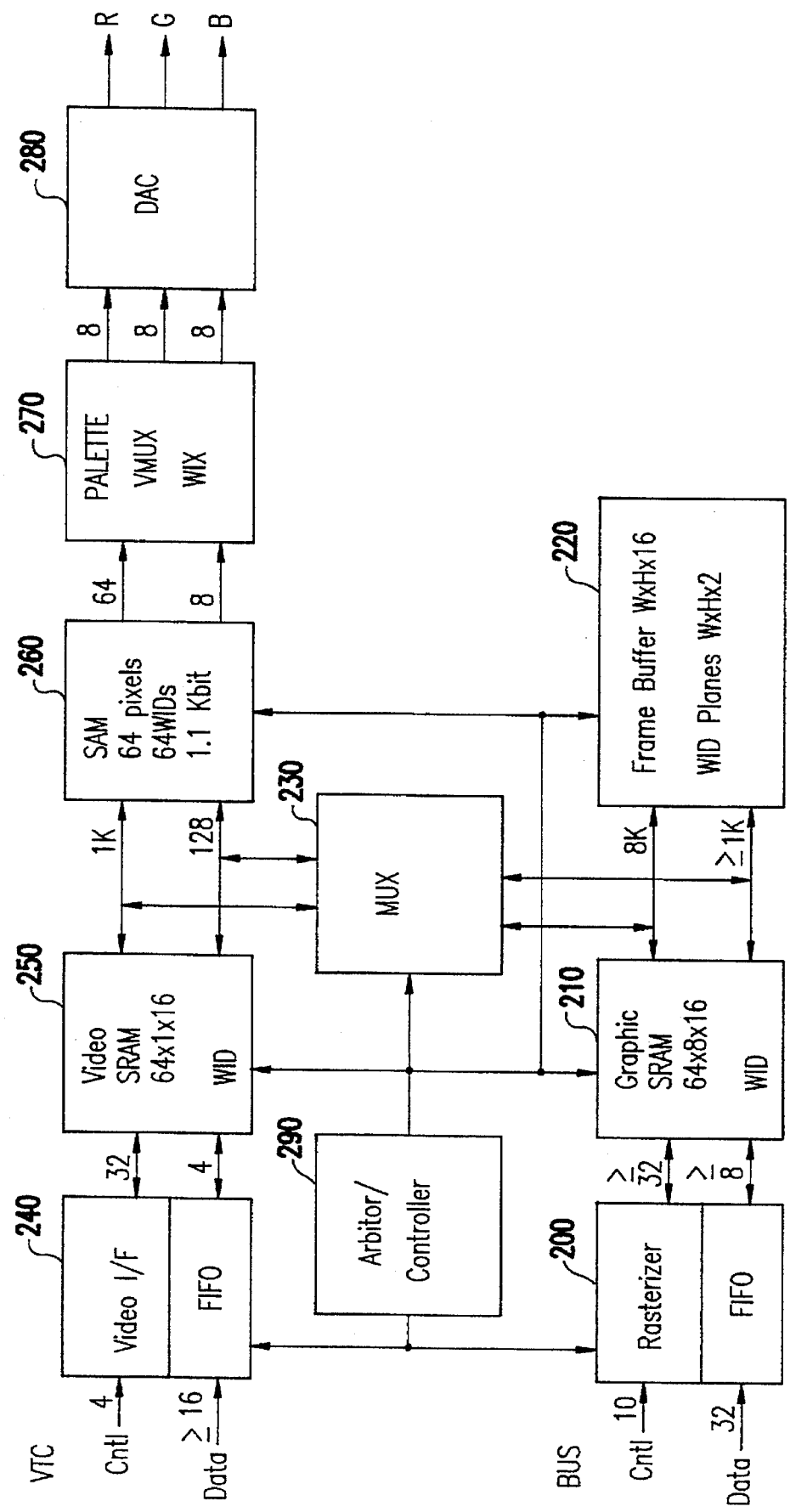
FIG. 2 is a block diagram of the Multi-Media Graphics Random Access Memory (MGRAM).

FIG. 2 shows a block diagram of the Multi-media Graphics Random Access Memory (MGRAM) according to the invention. The MGRAM is one monolithic module containing all of its functions in one chip. Connections between functions are internal to the chip and therefore are not limited by technology or packaging (i.e., pin count and input/output (I/O) speed). In FIG. 2, the Video Transfer Channel (VTC) supplies the data to the Video Interface (Video I/F) 240. The VTC may logically be a VMC (VESA Media Channel as defined by the Video Electronics Standards Committee). The VTC is a pre-existing IBM definition for such a channel. The Video I/F 240 receives a frame buffer address of a block of video data to be written. The Video I/F 240 contains a First-In, First-Out (FIFO) buffer to buffer data received during times when the Video SRAM 250 is not available due to previously scheduled accesses to the Frame Buffer 220. The FIFO may be up to 64 bytes deep to provide for the highest anticipated video rates. The Video I/F 240 requests the appropriate block of Frame Buffer/WID Planes 220 to be loaded to SRAM 250. By reading the associated WID bits, the Video I/F 240 determines which pixels of the Frame Buffer 220 are tagged as video pixels and modifies up to 64 pixels, in a horizontal scan, using video data. The operation of reading WID bits and writing pixels in Video SRAM 250 is pipelined, so that both occur each cycle.

The Rasterizer 200 also contains a smaller FIFO as small as 64 bits to buffer graphic data while the Graphic SRAM 210 is not available. The Arbiter/Controller 290 synchronizes and schedules the accesses of the separate memory components (the video SRAM 250 and WIDs, the graphic SRAM 210 and WIDs, the Serial Access Memory 260, and the Frame buffer 220) for video, rasterization, and screen refresh operations.

This scheduler function is key to balancing the loads and making the most of the high bandwidth interface to memory within the MGRAM for the combined video/graphics functionality. Since video frames are generally sequential through memory, the writing of one video block and reading of the adjacent video block (and associated WIDs) may be accomplished within one memory access. If the Video I/F 240 needs to update a block that is currently being updated in the Graphic SRAM 210, it is the Arbiter/Controller 290 that causes the Rasterizer 200 functions to suspend while that block is sent through the multiplexer 230 to the Video SRAM 250 for video update. The modified block is then redirected back to the Graphic SRAM 210 and the Rasterizer function is restarted. The Arbiter/Controller 290 also controls routine Frame Buffer/WID memory 220 refresh cycles and data transfer to the SAM 260 port.

The WID function allows protection of pixels during writes to the Video or Graphic SRAMs 250 or 210, respectively. The video pixels can be protected from graphic operations, and the graphic pixels can be protected from video overwrite. This protection does not occur during access to the Frame Buffer/WID planes 220 but independently in the Video SRAM 250 and Graphic SRAM 210 sections. Again, reads of WIDs and writes of pixels can be overlapped. WIDs are also used in the PALETTE/VMUX/WIX 270 for pixel interpretation. This may be used to distinguish from 8-bit or 16-bit RGB, 8-bit indexed, Buffer A, Buffer B, or YUV pixel types. They also could be used for multiple palette selection.

Performing the WID checking function simultaneously in both the cache SRAMs (Video SRAM 250 and Graphics SRAM 210) independently from the Frame Buffer 220 is important to the MGRAM efficiency.

The Video/WID SRAM 250 acts as a buffer between the Video Transfer Channel and the Frame Buffer 220. This component can be double buffered to allow prefetching the next block while the Video I/F 240 is updating the current block. The multiplexer (MUX) 230 provides the multiplexing function to match the 1K width of the Video SRAM 250 and SAM 260 to the 8K width of the Graphic SRAM 210 and Frame Buffer 220. The SAM 250 may be a partial SAM (of smaller size) to decrease gate count at the expense of some memory bandwidth.

The SAM 260 is the Serial Access Memory that provides the serialization function between the Frame Buffer 220 and the Palette portion of the Palette/VMUX/WIX 270. The SAM 260 converts parallel data from the frame buffer 220 to a serial stream of 4 pixels width. The WIX portion of the Palette/VMUX/WIX 270 provides a programmable Window Identifier index function that allows the programming and lookup of the WID bit's meaning.

The VMUX provides the necessary data Multiplexing function within the Palette/VMUX/WIX 270. The VMUX multiplexes the data from the appropriate 8-bit buffer to the Palette for 8-bit indexed pixels, or bypass the Palette in 16-bit mode. The Palette provides the 256 to 16 Million Color Lookup function for 8-bit indexed pixels. The DAC 280 provides the digital-to-analog conversion of the red, green, and blue (RGB) data.

The Rasterizer 200 performs standard function two dimensional raster operations. While these operations themselves are not new with this invention, the integration of the rasterizer with separate SRAM and Window Identifier circuitry into the memory module is part of this invention.

The Rasterizer functions useful to this invention are mainly the basic raster operations, including color expansion and arithmetic/logical operations, that are best tightly coupled to the high speed graphics SRAM. Some of the more notable functions to be provided by the rasterizer are listed below:

Bit Block Transfer from bus master to screen
Bit Block Transfer from screen to bus master
Horizontal Stipple from bus master to the screen (across)
Vertical Stipple from bus master to the screen (down)
Solid Line Draw
Pattern Line Draw with pattern fed from bus master
Set foreground color
Set background color
Set arithmetic/logical operation The integration of Video and Graphics Rasterization along with associated functional blocks as described herein, provides a balanced Multi-Media/Graphics solution to the technology/bandwidth problem of today's higher density memories. By containing both video, graphic rasterization, and window identifier functionality on the same chip, by providing fast Random Access Memory for each, and by sharing and containing the wide bus and high speed accesses to within the chip, a unique and effective solution is thereby provided. The problem is therefore solved in a manner beneficial to both rasterization and video components of Multi-Media and Graphics.

The apparatus as described above, includes the video Interface, Video SRAM, Rasterizer, Pixel SRAM, Frame Buffer, WID functionality, MUX, SAM, Palette, and DACs. While the Palette and DACs integration are not essential to this invention, they are desirable in the long run to minimize the I/Os on the MGRAM package and allow lower cost packaging of the MGRAM module.

In summary, the MGRAM provides for Video Interface through a Video Transfer Channel (VTC) to a high speed static memory, graphics interface through a processor bus and graphics rasterization primitives to a separate high speed static memory, and wide bus interface to the Frame buffer and Serial Access Memory (SAM) all of which are contained within the MGRAM module. The unique combination of video, rasterizer, Video SRAM, and Window Identifiers (WID) to identify the individual types of pixels, solves the technology/bandwidth problem in a manner allowing both video and graphics to share the high bandwidth Frame Buffer co-operatively.

The inclusion of WID (Window Identifiers) allows block access to selective pixels within the block. For example, one may wish to allow update to frame buffer-A pixels but not to frame buffer-B pixels or video pixels. Alternately, one may wish to allow the modification of only the video pixels without allowing changes to the frame buffer pixels. The WID SRAM is separately accessible from the pixel data and its access is therefore pipelined with the associated pixel SRAM. Inclusion of the WID storage and checking functionality to the module provides the necessary protection and performance for the Multi-Media/Graphics enablement. While Window Identifiers may protect against unintended writes to the video pixels, we also have allowed for intended writes to change ownership of video pixels to become rasterizer owned pixels during rasterization. This allows for the overlay of text onto video. When graphics is already in the process of updating a block of memory that video wants to update, the graphics is locked out until that block is transferred to video SRAM, the data is modified with new video information, and the block is then transferred back to the graphics SRAM.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A multi-media/graphics random access memory module integrated on a single chip comprising:
   a video interface connected to input pins for receiving data from a video transfer channel;
   a video static random access memory connected to said video interface to store data received from the video transfer channel;
   a rasterizer connected to input pins for receiving data from a processor bus;
   a graphic static random access memory connected to said rasterizer to store data received from the processor bus, said video and graphic static random access memories allowing for concurrent updating of both video and graphics;
   a frame buffer for storing data to be displayed;
   a palette providing a table lookup function for generating multi-bit color outputs;
   a serial access memory to serialize data from the frame buffer to the palette;
   a wide bus interface between the frame buffer and serial access memory and the video and graphic static random access memories; and
   a multiplexer connected to the video and graphic static random access memories for providing a multiplexing function to match a data width of the video static random access memory to the serial access memory and a data width of the graphic static random access memory to the frame buffer allowing multi-media sharing of the internal bandwidth of the module.

2. The multi-media/graphics random access memory module recited in claim 1 further comprising a digital-to-analog converter connected to receive said multi-bit color outputs from the pallette and to generate color analog outputs to output pins.

3. The multi-media/graphics random access memory module recited in claim 1 wherein window identifiers are included in each of said video and graphic static random access memories to allow block access to selective pixels within a block.

4. The multi-media/graphics random access memory module recited in claim 3 wherein said palette includes a window identifier index function to allow programming and lookup of window identifiers.

5. The multi-media/graphics random access memory module recited in claim 1 wherein said video interface and said rasterizer each include first-in, first-out buffers to buffer input data that is to be stored in said video and graphic static random access memories.

* * * * *